United States Patent
Dordoni

(10) Patent No.: US 8,435,024 B2
(45) Date of Patent: May 7, 2013

(54) DEVICE FOR BLOWING AND STRETCHING A PLASTIC PARISON FOR OBTAINING A CONTAINER

(75) Inventor: Claudio Dordoni, Parma (IT)

(73) Assignee: GEA Procomac S.p.A., Sala Baganza (IT)

( * ) Notice: Subject to any disclaimer, the term of this patent is extended or adjusted under 35 U.S.C. 154(b) by 0 days.

(21) Appl. No.: 12/999,554

(22) PCT Filed: Sep. 10, 2009

(86) PCT No.: PCT/IB2009/053975
§ 371 (c)(1),
(2), (4) Date: Dec. 16, 2010

(87) PCT Pub. No.: WO2011/030183
PCT Pub. Date: Mar. 17, 2011

(65) Prior Publication Data
US 2012/0164258 A1    Jun. 28, 2012

(51) Int. Cl.
*B29C 49/12* (2006.01)
(52) U.S. Cl.
USPC ............... 425/210; 425/3; 425/225; 425/529; 264/525; 264/532
(58) Field of Classification Search ............. 425/3, 210, 425/225, 529; 264/525, 532
See application file for complete search history.

(56) References Cited

U.S. PATENT DOCUMENTS

| | | | | |
|---|---|---|---|---|
| 3,712,784 | A | * | 1/1973 | Siard et al. ................... 425/526 |
| 4,039,641 | A | | 8/1977 | Collins et al. |
| 4,880,581 | A | | 11/1989 | Dastoli et al. |
| 6,214,282 | B1 | * | 4/2001 | Katou et al. .................. 264/524 |
| 6,722,868 | B1 | * | 4/2004 | Evrard ............................ 425/3 |
| 8,167,601 | B2 | * | 5/2012 | Matsushita et al. ............ 425/73 |
| 2008/0260887 | A1 | | 10/2008 | Adriansens et al. |

FOREIGN PATENT DOCUMENTS

EP   1982820 A1   10/2008
GB   1474044 A   5/1977

* cited by examiner

*Primary Examiner* — James Sanders
(74) *Attorney, Agent, or Firm* — Pearne & Gordon LLP

(57) ABSTRACT

Device (1) for blowing and stretching a plastic parison (3) for obtaining a container, comprising:
a blowing nozzle (4) having a first end (4a) to be applied to an inlet (3a) of said parison (3), said first end (4a) emerging in a controlled-contamination environment (5) wherein said parison (3) is blown;
a stretching rod (2);
means for injecting mid and high pressure air in said parison (3);
a non-magnetic tube (7) secured to a second end (4b) of the blowing nozzle (4) and defining a chamber (8) for housing, at least partially, the stretching rod (2), said chamber (8) being tight-sealed relative to a contaminated area (22) from which said controlled-contamination environment (5) is isolated;
a first magnet arrangement (9) and a second magnet arrangement (10) coupled together, said first magnet arrangement (9) being located outside said chamber (8) and said second magnet arrangement (10) being integral to said stretching rod (2) and located within said chamber (8).

15 Claims, 9 Drawing Sheets

FIG: 5

DEVICE FOR BLOWING AND STRETCHING A PLASTIC PARISON FOR OBTAINING A CONTAINER

TECHNICAL FIELD AND BACKGROUND ART

The present invention relates to a device for blowing and stretching a plastic parison for obtaining a container. The proposed device finds application in the sector of bottling with aseptic technology, for example in a moulding apparatus.

As it is known, in a bottling line using aseptic technology, controlling contamination is of primary importance for the containers to be filled, for the filling product and for the environments in which moulding and filling of the containers take place. In a bottling line using aseptic technology, it is indeed fundamental to ensure correct filtering of the gaseous fluids to be introduced into the controlled environment, correct management of the pressures in various zones so as to control the path of any undesirable particles, correct monitoring of the environment, and correct management and adequate quality of the C.I.P. (Cleaning-in-Place) and S.I.P. (Sterilization-in-Place) cycles. Control of environmental contamination in bottling plants was introduced at the beginning of the nineties with the adoption of "clean rooms", i.e. contamination-controlled rooms inside which machines (e.g. blowing and filling machines) are installed.

A blowing machine supports blowing moulds which are made to open and close in order to receive parisons and mould the containers by blowing mid and high pressure air in parisons and by stretching them with a rod. The driving components of the moulds (i.e. rods, cams, rollers, actuators) have to be lubricated with oleous substances which results in accumulation, in proximity of the moulds themselves, of dirt and dust originated from wear. Therefore, the risks of environmental contamination are very high.

The current Applicant has recently developed a new moulding apparatus for a bottling line using aseptic technology. The new moulding apparatus comprises a moulding machine (i.e. a rotary carousel blowing machine), driving components for the machine and an isolation device suitable for defining a controlled-contamination environment for housing the machine. The carousel machine supports moulds of the "book" type, each constituted by two relatively movable half-portions and a bottom element cooperating with the half-portions in order to shape a bottom of the container. It must be pointed out that the driving components (including driving components specifically meant for the moulds) are located outside the controlled-contamination environment. In particular, the apparatus is equipped with tubular bodies, disposed partly inside and partly outside the environment, defining tubular cavities for the passage of the driving components. For example, rods for opening/closing the moulds rotate inside corresponding tubular bodies, thus causing the half-portions to move apart or to approach. On the other side, rods for raising/lowering the bottom element slide longitudinally inside corresponding tubular bodies in such a way as to allow the engagement/disengagement of the bottom element with the half-portions.

The new apparatus poses the necessity to develop a new device for blowing and stretching a plastic parison. Indeed, in prior art solutions, a blowing nozzle used to be applied to the mouth of the parison in order to inject mid and high pressure air (maximum 40 bar). Contemporaneously, a stretching rod used to be inserted into the parison from the mouth, the insertion of the stretching rod being guided by the blowing nozzle itself.

The main drawback of the prior art blowing and stretching solutions regard the fact that they are not suitable for being used in association with an isolation device. Indeed, the blowing nozzle actually constitutes a channel that, in case of application in the new apparatus, would link the controlled-contamination environment and the external (dirty) environment. Moreover, other solutions adopting elastic bellows in association with the stretching rod are not compatible with the sterilization issues concerning the stretching rod and the internal walls of the bellows. As a matter of fact, the pressure exerted by liquid and gaseous sterilizing substances would result in deformation of the bellows.

In this context, the technical task at the basis of the present invention is to provide a device for blowing and stretching a plastic parison for obtaining a container, which overcomes the drawbacks of the above-mentioned known art.

DISCLOSURE OF THE INVENTION

In particular, it is an object of the present invention to provide a device for blowing and stretching a plastic parison for obtaining a container, in which the stretching rod may be easily sterilized and reliably preserved in sterilized condition.

Another object of the present invention is to make available a device for blowing and stretching a plastic parison for obtaining a container, which contributes to preserve environmental contamination below a desired level.

A further object of the present invention is to provide a device for blowing and stretching a plastic parison for obtaining a container, which is structurally simple and compact.

BRIEF DESCRIPTION OF DRAWINGS

Further characteristics and advantages of the present invention will become more apparent from the following approximate, and hence non-restrictive, description of a preferred, but non exclusive, embodiment of a device for blowing and stretching a plastic parison for obtaining a container, as illustrated in the appended drawings, in which.

BEST MODE FOR CARRYING OUT THE INVENTION

Figure 1:
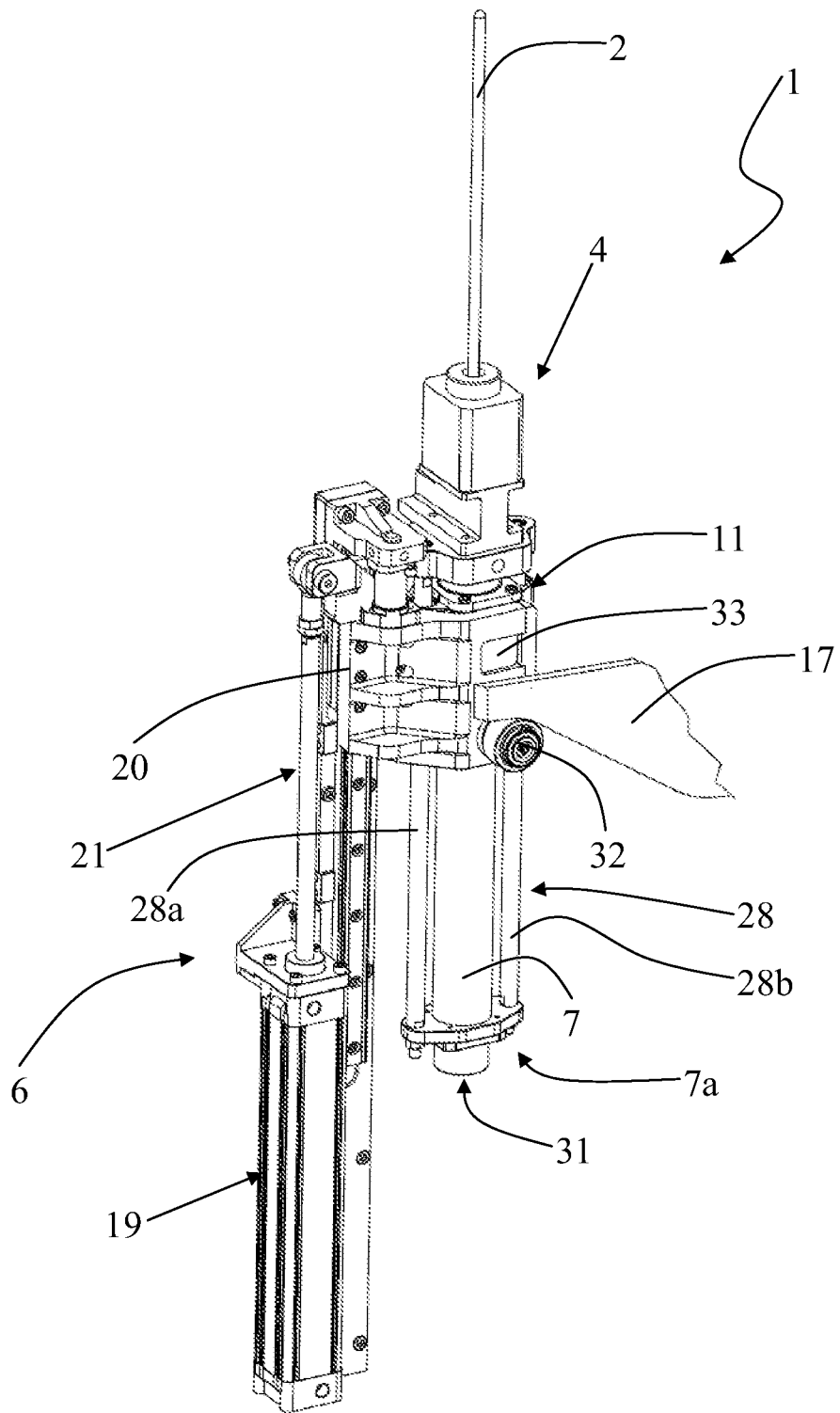
FIG. 1 illustrates a perspective view of a device for blowing and stretching a plastic parison for obtaining a container, according to the present invention.
Figure 2:
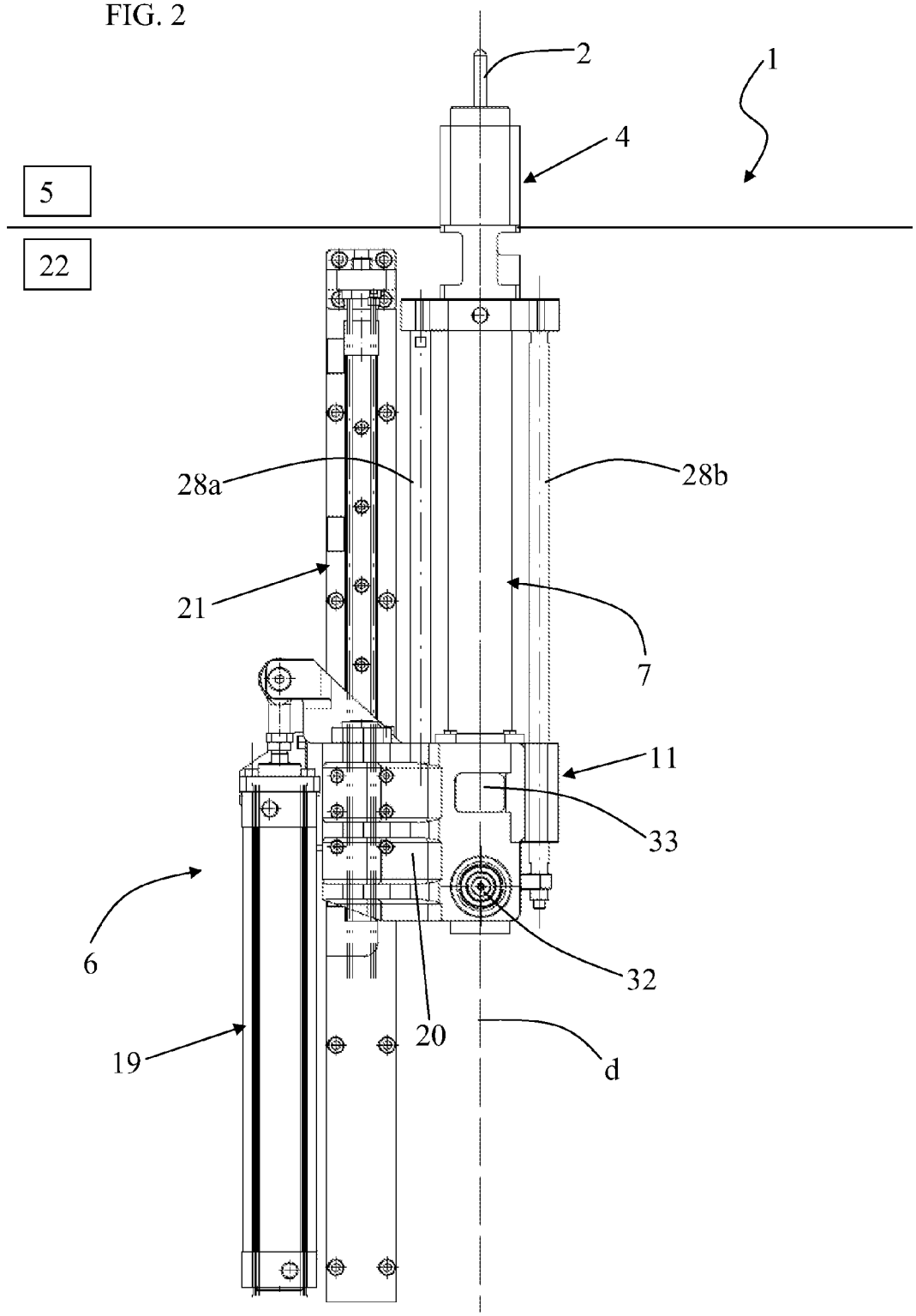
FIGS. 2 and 3 illustrate, respectively, a front view and a cutaway front view of the device of FIG. 1, in a first operating condition.
Figure 3:
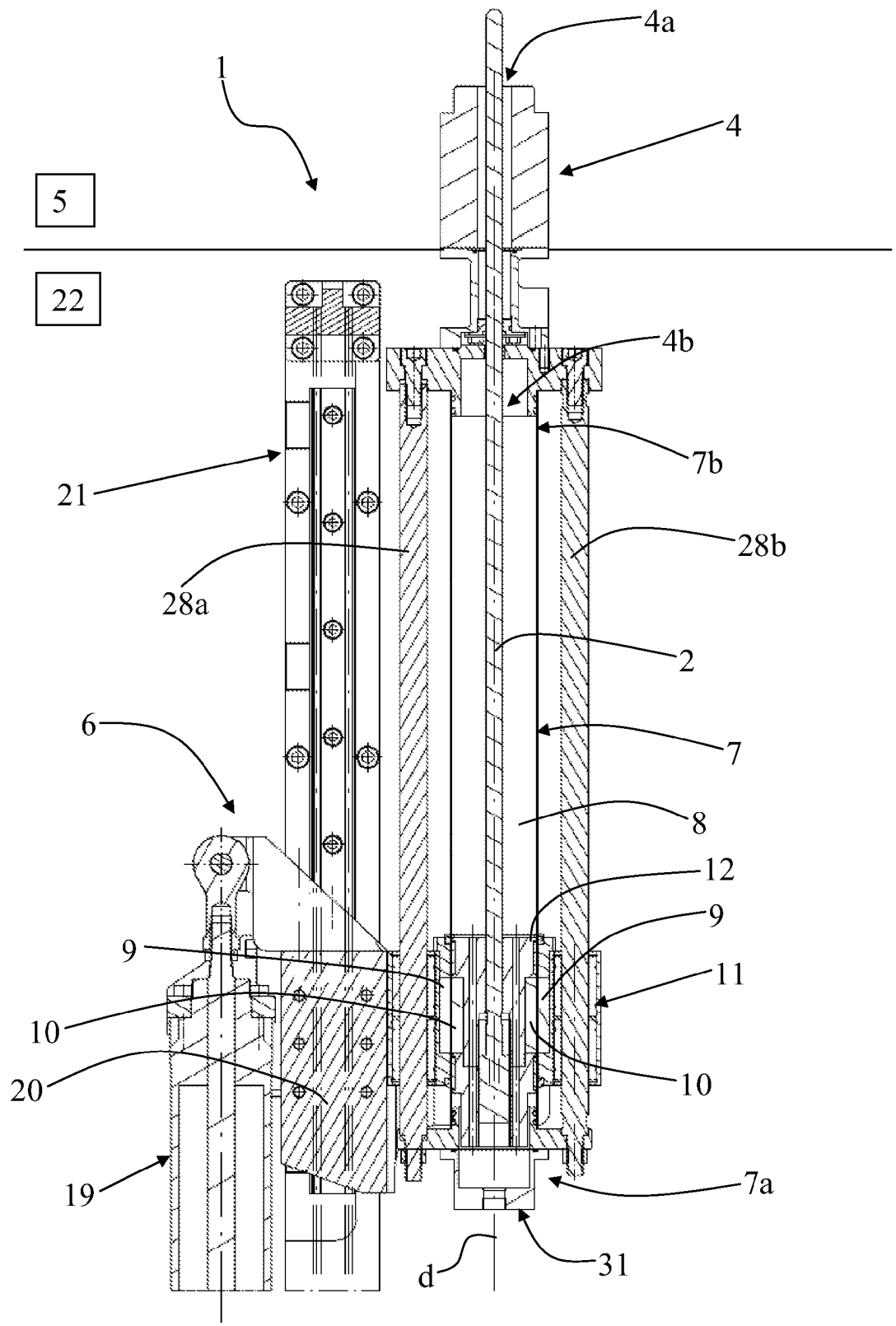
Figure 4:
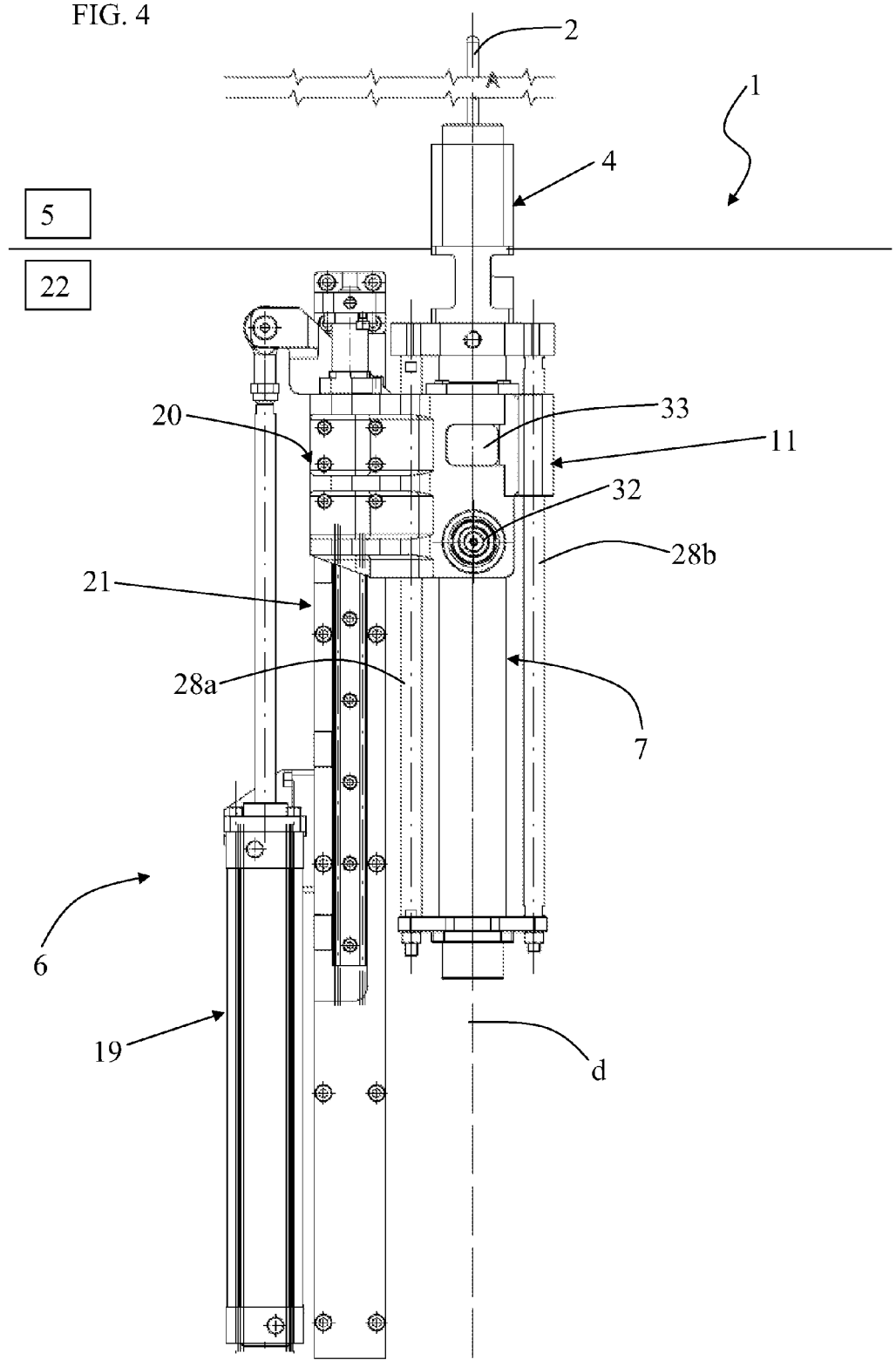
FIGS. 4 and 5 illustrate, respectively, a front view and a cutaway front view of the device of FIG. 1, in a second operating condition.
Figure 5:
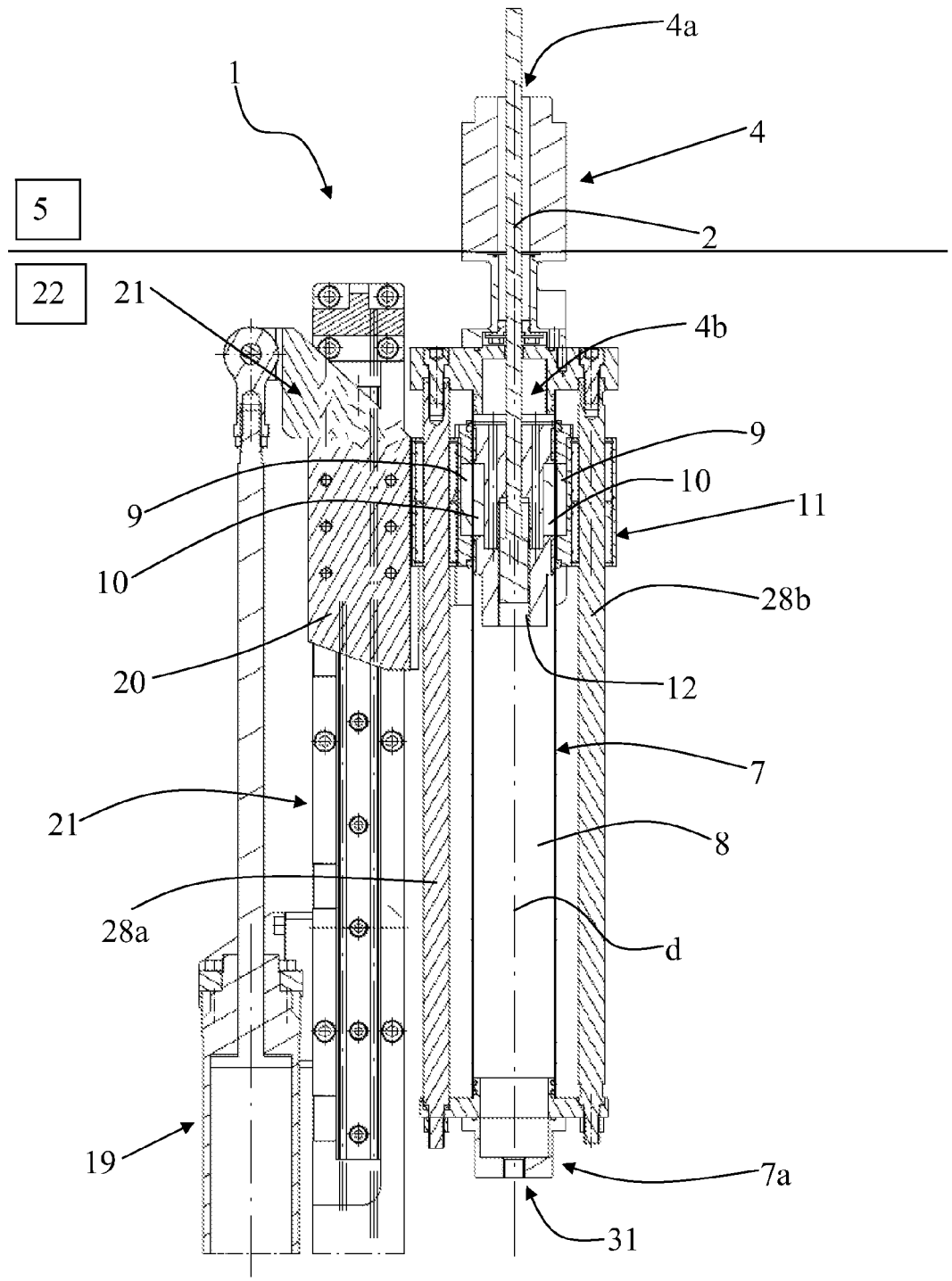
Figure 6:
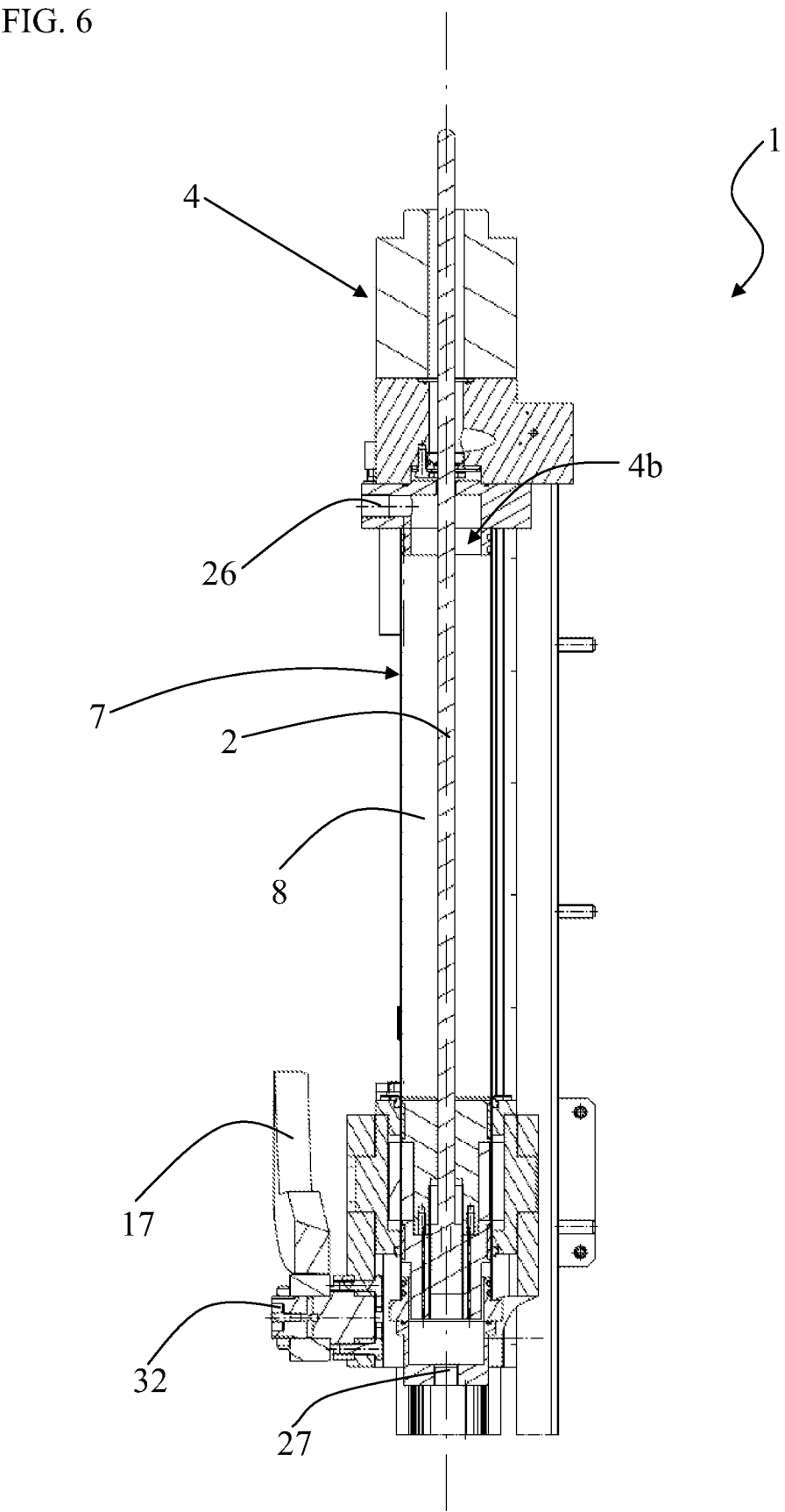
FIG. 6 illustrates a cutaway view of the device of FIG. 1 (some parts have been removed for the sake of clarity)

With reference to the figures, 1 indicates a device for blowing and stretching a plastic parison 3 for obtaining a container. The device 1 comprises a blowing nozzle 4 having a first end 4a and a second end 4b. The blowing nozzle 4 is located partly in a controlled-contamination environment 5, wherein the parison 3 is blown, and partly in a contaminated area 22. The controlled-contamination environment 5 is isolated, that means physically separated, from a contaminated area 22 by means of an isolation device (not illustrated). The first end 4a of the blowing nozzle 4, emerging in the controlled-contamination environment 5, is susceptible to be applied to an inlet 3a of the parison 3. As shown in FIGS. 3 and 5, the second end 4b of the blowing nozzle 4 emerges in the contaminated area 22. The device 1 is equipped with a stretching rod 2 passing through the blowing nozzle 4. In particular, the stretching rod 2 passes through the blowing nozzle 4 from the first end 4a to the second end 4b of the blowing nozzle 4. The stretching rod 2 may be inserted in and extracted out of the parison 3 through the inlet 3a of the parison 3 itself by activating means 6.

The device 1 comprises means (not illustrated) for injecting mid and high pressure air in said parison 3 through the blowing nozzle 4. Said injecting means include solenoid valves of the known type for injecting mid pressure air typically up to 15 bar and high pressure air typically up to 40 bar.

The device 1 comprises a case 7 secured to the second end 4b of the blowing nozzle 4 and defining a chamber 8 for housing, at least partially, the stretching rod 2. In particular, as illustrated in FIGS. 2-5, the case 7 is entirely located in the contaminated area 22. Said chamber 8 is tight-sealed relative to the contaminated area 22 so that the whole stretching rod (2) avoids to come in contact with said contaminated area (22). Indeed, the stretching rod 2, being partially located in the chamber 8 and partially located inside the blowing nozzle 4 with the possibility to emerge in the parison 3, is maintained separated from the contaminated area 22. The activating means 6 are located outside the controlled-contamination environment 5, that means they are in the contaminated area 22. Preferably, the chamber 8 is tight-sealed also relative to the controlled-contamination environment 5.

The case 7, made of non-magnetic material (i.e. stainless steel), is shaped as a tube extending in a predefined direction d. Preferably, a first end section 7a of the tube 7 is closed by a cap 31 provided with a tight-sealed gasket. A second end section 7b of the tube 7, opposite to said first end section 7a, is secured to the second end 4b of the blowing nozzle 4.

The activating means 6 comprise a first magnet arrangement 9 which is magnetically coupled with a second magnet arrangement 10 located within said chamber 8 and integral to the stretching rod 2. For example, the first magnet arrangement 9 is a permanent magnet arrangement or it is an electromagnet.

Figure 7:
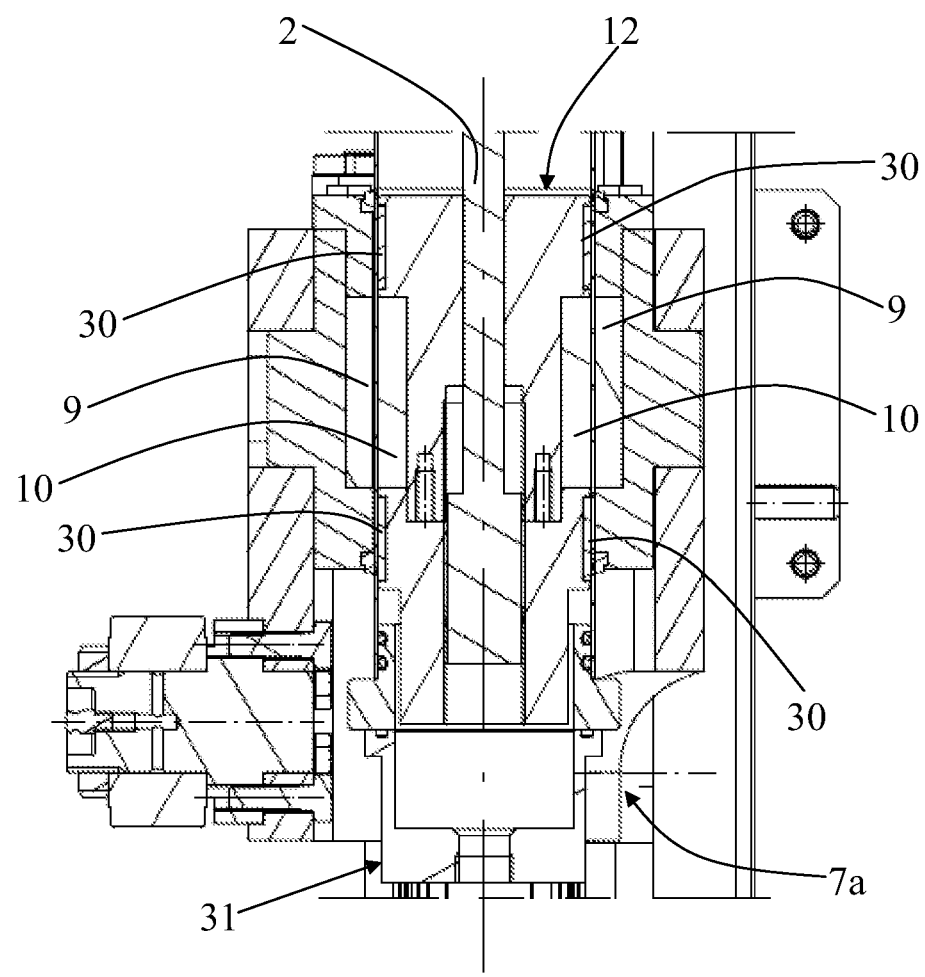
FIG. 7 illustrates a cutaway view of a portion of the device of FIG. 1 (first embodiment)

The second magnet arrangement 10 is supported by a piston 12 movably arranged inside the chamber 8 and bearing the stretching rod 2. In particular, the piston 12 is provided with rings 30 sliding on an inner surface of the tube 7. In the embodiment illustrated herein (see, for example, FIG. 7), the piston 12 bears two sliding rings 30, i.e. made of plastic material. The second magnet arrangement 10 is maintained at a predefined distance from said inner surface.

The activating means 6 comprise a sleeve 11 supporting the first magnet arrangement 9 and slidably mounted on the tube 7 along said predefined direction d. The first magnet arrangement 9 is maintained at another predefined distance from an outer surface of the tube 7.

Preferably, the first magnet arrangement 9 comprises at least two external annular magnets separated by a non-magnetic external annular spacer. The external annular magnets and the external annular spacer encircle the tube 7.

Preferably, the second magnet arrangement 10 comprises at least two internal annular magnets separated by a non-magnetic internal annular spacer. The internal annular magnets and the internal annular spacer are encircled by the tube 7.

The device 1 is provided with an inlet 26 for introducing cleaning and sterilizing substances inside the chamber 8 and an outlet 27 for discharging them out of the chamber 8. Preferably, the inlet 26 is located in correspondence of the second end 4b of the blowing nozzle 4, while the outlet 27 is located in correspondence of the cap 31.

In a first embodiment, the sliding rings 30 present grooves (not illustrated) so that, with the piston 12 in an intermediate position between the first end section 7a and the second end section 7b of the tube 7, air, cleaning and sterilizing substances may flow through said grooves.

Figure 8:
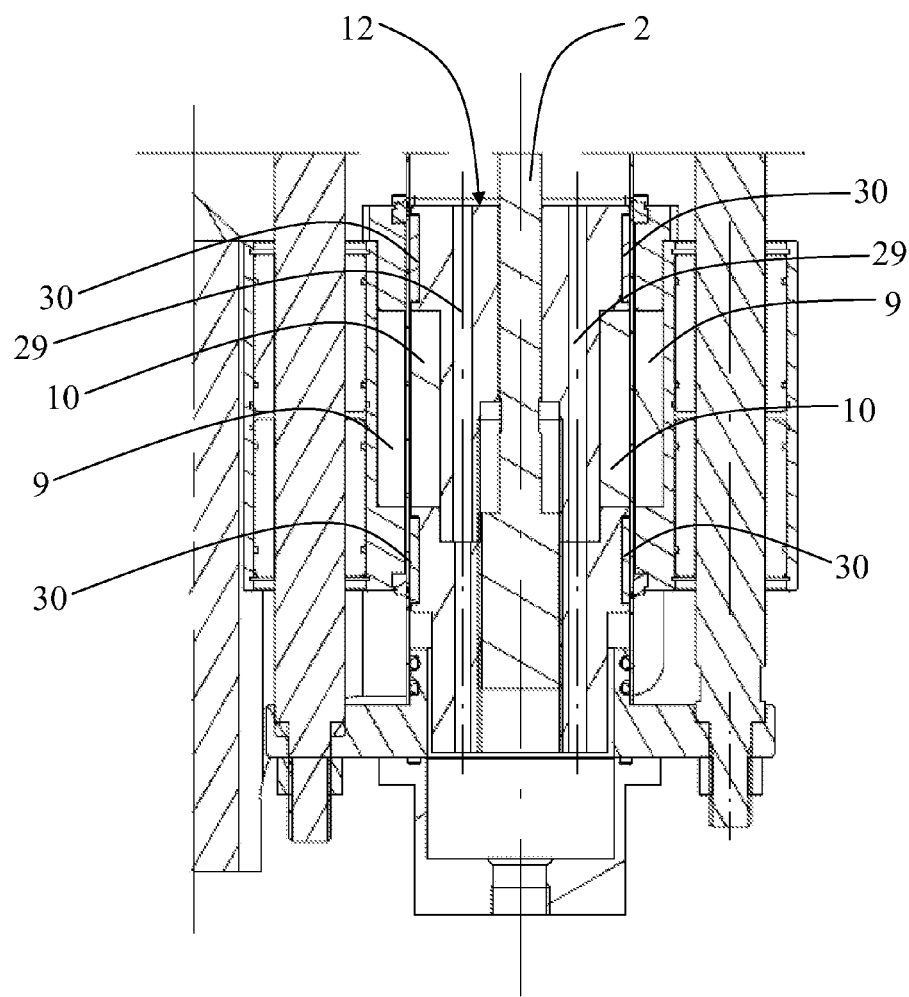
FIG. 8 illustrates a cutaway view of a portion of the device of FIG. 1 (second embodiment)
Figure 9:
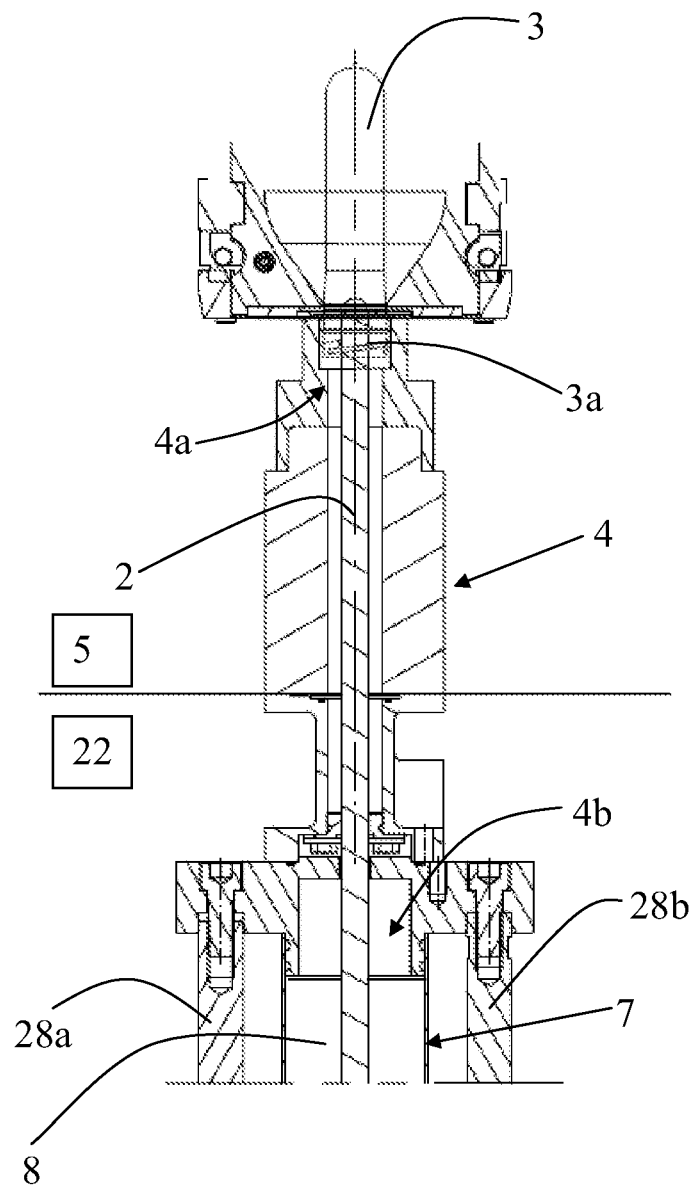
FIG. 9 illustrates a cutaway view of a portion of the device of FIG. 1 applied to a parison.

In a second embodiment, the piston 12 is provided with at least one duct 29 so that, with the piston 12 in an intermediate position between the first end section 7a and the second end section 7b of the tube 7, air, cleaning and sterilizing substances may flow through the duct 29. For example, as shown in FIG. 8, the piston 12 presents two ducts 29 parallel to said predefined direction d and passing through the piston 12.

The device 1 comprises a guiding assembly 28 operatively active on the sleeve 11 so as to maintain it sliding along the tube 7 substantially parallel to said predefined direction d. Preferably, the guiding assembly 28 comprises two guiding rods 28a, 28b parallel to the tube 7 and passing through corresponding cavities obtained in said sleeve 11. Each guiding rod 28a, 28b is secured, at one end, to the cap 31 and, at the other end, to the blowing nozzle 4.

The activating means 6 comprise a pneumatic cylinder 19 operatively active on a carriage 20 for sliding it along a slide bar 21. For example, said slide bar 21 is a rolling slide bar 21. The carriage 20 is integral with the sleeve 11. Preferably, the carriage 20 and the sleeve 11 are rigidly coupled relative to the predefined direction d by means of a die slide 33 so as to establish a clearance substantially perpendicular to the predefined direction d. Alternatively to the pneumatic cylinder 19, an electric motor may be employed.

The functioning of the device for blowing and stretching a plastic parison for obtaining a container, according to the present invention, is described below.

The controlled-contamination environment 5 undergoes C.I.P. and S.I.P. treatments to reduce the presence of bacteria, dirt and other contaminating substances. The blowing and stretching device 1 is employed, for example, in a rotary carousel blowing machine (not illustrated).

The parison 3 to be blown is located in the controlled-contamination environment 5, with its longitudinal axis parallel to the predefined direction d. In the embodiment illustrated herein, the inlet 3a of the parison 3, that means its mouth, is downward oriented. Nevertheless, the inlet 3a of the parison 3 may be upward oriented.

The parison 3, previously heated, is inserted between two half-portions of an open mould supported by the carousel machine. The half-portions are brought progressively closer and, contemporaneously, a bottom element of the mould is made to engage with the half-portions. Once closed, the mould is locked.

The first end 4a of the blowing nozzle 4 is applied to the inlet 3a of the parison 3. First, the device 1 is in a first operating condition (FIGS. 2 and 3), that means the carriage 20 and the sleeve 11 are in proximity of the first end section 7a of the tube 7. Due to the magnetic coupling between the first magnet arrangement 9 and the second magnet arrangement 10, the piston 12 is also located at the first end section 7a of the tube 7. The injecting means blow mid pressure air in the parison 3 through the blowing nozzle 4. Thus, the diameter of the parison 3 increases. Contemporaneously, the pneumatic cylinder 19 makes the carriage 20 to slide along the slide bar 21. The sleeve 11, being integral to the carriage 20, slides on the tube 7 along the predefined direction d, from the first end section 7a to the second end section 7b. The sliding of the sleeve 11 is guided by the guiding rods 28a, 28b. Due to the magnetic coupling between the first magnet arrangement 9 and the second magnet arrangement 10, the sliding rings 30 of the piston 12 slide on the inner surface of the tube 7. Thus, the device 1 reaches a second operating condition, illustrated in FIGS. 4 and 5. During the movement of the piston 12, the air passes through the grooves of the sliding rings 30 or the ducts 29 of the piston 12. The stretching rod 2, being integral to the piston 12, is inserted inside the parison 3, passing through the inlet 3a of the parison 3 itself. The stretching rod 2 is gradually inserted inside the parison 3 for the entire length of the parison 3 itself. Thus, the parison 3 is stretched accordingly to its longitudinal axis.

It must be noted that the carriage 20 is equipped with a roller 32 rotating so as to engage with a cam 17 integral to the carousel machine. Thus, speed and acceleration of the stretching rod 2 during the insertion/extraction movements is determined by the coupling between the roller 32 and the cam 17.

Later on, the injecting means blow high pressure air in the parison 3 through the blowing nozzle 4. Thus, the parison 3 is made to adhere to the inner walls of the mould so as to obtain the container. Contemporaneously, the carriage 20 reverses its sliding along the slide bar 21 preferably due to the coupling between the roller 32 and the cam 17. The sleeve 11, being integral to the carriage 20, slides on the tube 7 along the predefined direction d, from the second end section 7b to the first end section 7a. Due to the magnetic coupling between the first magnet arrangement 9 and the second magnet arrangement 10, the sliding rings 30 of the piston 12 slide on the inner surface of the tube 7. The stretching rod 2, being integral to the piston 12, is gradually extracted from the parison 3.

The high pressure is maintained inside the container for a predefined time so that the container is strengthened.

The chamber 8 of the device 1 may be sterilized during working by introducing sterilizing substances through the inlet 26 located in correspondence of the second end 4b of the blowing nozzle 4. Said sterilizing substances, flowing through the grooves of the sliding rings 30 or through the ducts 29 of the piston 12, are then discharged through the outlet 27 located in correspondence of the cap 31.

The characteristics of the device for blowing and stretching a plastic parison for obtaining a container, according to the present invention, emerge clearly from the description provided, as do the advantages thereof. In particular, thanks to the fact that the stretching rod 2 is housed in a chamber 8 that is tight-sealed relative to the contaminated area 22, the stretching rod may be easily cleaned and sterilized and reliably preserved in sterilized condition.

Moreover, since the activating means are located outside the controlled-contamination environment, any build-up of dirt (dust, lubrication oil) on them will not impact the environment in which the parison 3 is blown, thus enabling the contamination to be easily maintained within the desired level.

Furthermore, the employment of two magnet arrangements coupled together allows to simplify the structure of the blowing and stretching device with respect to the prior art solutions.

Finally, thanks to the grooves or ducts obtained in the piston, the tube is unaffected by the pressure exerted by air or sterilizing substances (liquid and gaseous).

The invention claimed is:

1. Device for blowing and stretching a plastic parison for obtaining a container, comprising:

a blowing nozzle having a first end to be applied to an inlet of said parison, said first end emerging in a controlled-contamination environment wherein said parison is blown, said controlled-contamination environment being isolated from a contaminated area;

a stretching rod passing through said blowing nozzle;

means for activating the insertion/extraction of the stretching rod in/out of the parison through said inlet;

means for injecting mid and high pressure air in said parison through said blowing nozzle, characterised in that it comprises a case secured to a second end of the blowing nozzle and defining a chamber for housing, at least partially, the stretching rod, said chamber being tight-sealed relative to said contaminated area so that the whole stretching rod avoids to come in contact with said contaminated area, said activating means being located outside said controlled-contamination environment.

2. Device according to claim 1, wherein said chamber is tight-sealed relative to said contamination-controlled environment.

3. Device according to claim 1, wherein said activating means comprise a first magnet arrangement which is magnetically coupled with a second magnet arrangement located within said chamber and integral to said stretching rod, said case being made of non-magnetic material.

4. Device according to claim 3, wherein said case is shaped as a tube extending in a predefined direction.

5. Device according to claim 4, wherein said activating means further comprise a sleeve supporting said first magnet arrangement and slidably mounted on said tube along said predefined direction, said second magnet arrangement being supported by a piston movably arranged inside said chamber and bearing the stretching rod.

6. Device according to claim 4, wherein said first magnet arrangement comprises at least two external annular magnets separated by a non-magnetic external annular spacer, said external annular magnets and said external annular spacer encircling said tube.

7. Device according to claim 4, wherein said second magnet arrangement comprises at least two internal annular magnets separated by a non-magnetic internal annular spacer, said internal annular magnets and said internal annular spacer being encircled by said tube.

8. Device according to claim 4, further comprising an inlet for introducing cleaning and sterilizing substances inside said chamber and an outlet for discharging them out of said chamber.

9. Device according to claim 5, wherein said piston is provided with at least one duct so that, with the piston in an intermediate position between a first end section and a second end section of the tube, air, cleaning and sterilizing substances may flow through said at least one duct.

10. Device according to claim 5, wherein said piston is provided with rings sliding on an inner surface of said tube, said second magnet arrangement being maintained at a predefined distance from said inner surface.

11. Device according to claim 10, wherein said sliding rings present grooves so that, with the piston in an intermediate position between a first end section and a second end section of the tube, air, cleaning and sterilizing substances may flow through said grooves.

12. Device according to claim 5, further comprising a guiding assembly operatively active on said sleeve so as to maintain it sliding along the tube substantially parallel to said predefined direction.

13. Device according to claim 12, wherein said guiding assembly comprises two guiding rods parallel to said tube and passing through corresponding cavities obtained in said sleeve.

14. Device according to claim 5, wherein said activating means further comprise a pneumatic cylinder operatively active on a carriage for sliding it along a slide bar, said carriage being integral with said sleeve.

15. Device according to claim 14, wherein said carriage and said sleeve are rigidly coupled relative to said predefined direction by means of a die slide so as to establish a clearance substantially perpendicular to said predefined direction.

\* \* \* \* \*